(12) United States Patent
Smith (10) Patent No.: US 8,484,067 B2
(45) Date of Patent: Jul. 9, 2013

(54) SYSTEM, PROCESS, AND COMPUTER PROGRAM PRODUCT FOR EVALUATING LEADS

(75) Inventor: Iain Smith, North Barrington, IL (US)

(73) Assignee: ADP, Inc., Hoffman Estates, IL (US)

( * ) Notice: Subject to any disclaimer, the term of this patent is extended or adjusted under 35 U.S.C. 154(b) by 790 days.

(21) Appl. No.: 12/494,973

(22) Filed: Jun. 30, 2009

(65) Prior Publication Data
US 2010/0332291 A1    Dec. 30, 2010

(51) Int. Cl.
*G06Q 10/00* (2012.01)

(52) U.S. Cl.
USPC .......................................... 705/7.29; 705/7.36

(58) Field of Classification Search
USPC ................................................ 705/7.29, 7.36
See application file for complete search history.

(56) References Cited

U.S. PATENT DOCUMENTS

| | | | |
|---|---|---|---|
| 6,038,554 A | 3/2000 | Vig | |
| 6,067,525 A * | 5/2000 | Johnson et al. | 705/7.13 |
| 7,050,982 B2 * | 5/2006 | Sheinson et al. | 705/26.1 |
| 7,778,885 B1 * | 8/2010 | Semprevivo et al. | 705/26.1 |
| 7,979,341 B2 * | 7/2011 | Hanifi | 705/37 |
| 8,326,676 B2 * | 12/2012 | Rose et al. | 705/7.33 |
| 2002/0077998 A1 | 6/2002 | Andrews et al. | |
| 2003/0078788 A1 | 4/2003 | Sussman et al. | |
| 2003/0229577 A1 | 12/2003 | Nabel | |
| 2004/0143473 A1 * | 7/2004 | Tivey et al. | 705/8 |
| 2004/0143476 A1 | 7/2004 | Kapadia et al. | |
| 2004/0143482 A1 | 7/2004 | Tivey et al. | |
| 2004/0143484 A1 | 7/2004 | Kapadia et al. | |
| 2005/0060313 A1 | 3/2005 | Naimat et al. | |
| 2005/0131760 A1 | 6/2005 | Manning et al. | |
| 2005/0171859 A1 * | 8/2005 | Harrington et al. | 705/26 |
| 2006/0100894 A1 | 5/2006 | Weiner et al. | |
| 2006/0195385 A1 * | 8/2006 | Khetrapal et al. | 705/37 |
| 2007/0073607 A1 | 3/2007 | Eydelman | |
| 2007/0092071 A1 | 4/2007 | Grell | |
| 2007/0179831 A1 | 8/2007 | Patnaik et al. | |
| 2007/0219851 A1 | 9/2007 | Taddei et al. | |
| 2007/0233559 A1 * | 10/2007 | Golec | 705/14 |
| 2007/0233560 A1 * | 10/2007 | Golec | 705/14 |
| 2007/0233561 A1 * | 10/2007 | Golec | 705/14 |

(Continued)

FOREIGN PATENT DOCUMENTS

WO    WO 03/030051    4/2003

OTHER PUBLICATIONS

ADP Dealer Services Launches Digital Advertising. anonymous. Wireless News pp. 1 Feb. 14, 2008.*

(Continued)

*Primary Examiner* — Johnna Loftis
(74) *Attorney, Agent, or Firm* — Maginot, Moore & Beck, LLP (57) ABSTRACT

System, process, and computer program product for evaluating a lead are provided. A process for evaluating a lead may include determining whether each incoming lead is duplicative, determining a score for each lead, valuing each lead based on the lead score and outcome data, and determining sales capacity and the motor vehicle dealer's existing need for leads. The process may also include applying business rules to each lead using a processor, where the business rules may include the real-time optimization of sales capacity and lead need of a motor vehicle dealer. The process may further include routing each lead based upon the satisfaction of the business rules.

21 Claims, 5 Drawing Sheets

U.S. PATENT DOCUMENTS

| | | | |
|---|---|---|---|
| 2008/0015954 A1 | 1/2008 | Huber et al. | |
| 2008/0109444 A1 | 5/2008 | Williams et al. | |
| 2008/0109445 A1* | 5/2008 | Williams et al. | 707/10 |
| 2008/0201184 A1* | 8/2008 | Rose et al. | 705/7 |
| 2008/0201202 A1* | 8/2008 | Rose et al. | 705/10 |
| 2008/0201203 A1* | 8/2008 | Rose et al. | 705/10 |
| 2008/0201204 A1 | 8/2008 | Rose et al. | |
| 2008/0201205 A1* | 8/2008 | Rose et al. | 705/10 |
| 2008/0288361 A1* | 11/2008 | Rego et al. | 705/26 |
| 2008/0306812 A1* | 12/2008 | Bowen et al. | 705/11 |
| 2008/0313018 A1* | 12/2008 | Kamm et al. | 705/10 |
| 2009/0018894 A1* | 1/2009 | Zamani et al. | 705/10 |
| 2009/0037356 A1 | 2/2009 | Rothstein et al. | |
| 2009/0048859 A1 | 2/2009 | McCarthy et al. | |
| 2009/0055251 A1 | 2/2009 | Shah et al. | |
| 2009/0287595 A1* | 11/2009 | Hanifi | 705/37 |
| 2010/0023447 A1* | 1/2010 | MacInnis | 705/38 |

OTHER PUBLICATIONS

Q4 2007 Dealer Track Holdings, Inc. Earnings Conference Call—Final. Fair Disclosure Wire Feb. 19, 2008.*

Kontzer, Tony. Software Drives Customers to Buy. Information Week n1048, pp. 42-44, Jul. 18, 2005.*

* cited by examiner

Date Selection: From: To: Lead Type: Dealership: Brand:

Month to Date | All | All | All

Make: Ford     Lead Score: ☆ ☆ ☆ ☆ ☆     Model: Fusion     Export To selected Format ▸ Export Dealer: ABC Motors     Lead Provider: Cars.com
Lead Date: 4/21/2009 12:36 PM     Duplicate Lead: No

Lead Details | Sale Details

Original Lead Data     Hygiened Lead Data (Hygiene Date: 3/31/2009)

First Name: John
Last Name: Smith
Address 1: 10 First Avenue     234 Central Av
Address 2: Apt 100
City: Skokie
State: IL
Zip: 60076
Phone: 717-444-5555
Email: jDoe@yahoo.com

Alternate Vehicles (In Brand)

| Brand | Year | | Score | New In Stock | Used In Stock |
|---|---|---|---|---|---|
| Ford | 2009 | Escape | 4 | 2 | 1 |
| Ford | 2009 | Falcon | 4 | 4 | 1 |
| Ford | 2009 | Taurus | 4 | 4 | 2 |

Alternate Vehicles (Out of Brand)

| Brand | Year | | Score | New In Stock | Used In Stock |
|---|---|---|---|---|---|
| GM | 2009 | Chevy Cobalt Coupe | 4 | 4 | 2 |
| GM | 2009 | Pontiac | 4 | 5 | 1 |
| GM | 2009 | Saturn | 4 | 2 | 1 |

Vehicle(s) In Garage

| Brand | Year | | Provided By |
|---|---|---|---|
| Ford | 2005 | Escape | ADP |
| Toyota | 2000 | Tercel | Acxiom |

Sales Insights

Safety features should be emphasized for this family.
This family may have special needs for a new driver.
This family is likely interested in seating capacity and in-vehicle entertainment features.

Figure 4

SYSTEM, PROCESS, AND COMPUTER PROGRAM PRODUCT FOR EVALUATING LEADS

BACKGROUND

Most car buyers start the automotive shopping process by doing research on the Internet. Automotive research sites such as KBB.com and Edmunds.com monetize this traffic by selling vehicle quote requests that have been generated by visitors of the research site to motor vehicle dealers. The emergence of the Internet as a research tool has resulted in an increase in the number of quote requests. This increase in quote requests has diluted the quality of leads and made it difficult for dealers to understand the value of these leads to their dealerships. Given the high cost and inconsistent quality of Internet leads, there exists a need for improved ways for dealers to quickly evaluate the quality of the lead to help in their current and future lead purchase decision making.

SUMMARY

An aspect of the present disclosure comprises a process for evaluating motor vehicle leads for a motor vehicle dealer. At least one embodiment of such process may comprise the steps of determining a score for each lead; valuing each lead at least based on the score of the lead and outcome data stored in an outcome database, the outcome data comprises historical information on lead closings; determining at least sales capacity and lead need data of a motor vehicle dealer; using a processor to apply business rules to at least the score and value of each lead, the business rules comprise at least the real-time optimization of sales for the motor vehicle dealer based at least partially upon the sales capacity and lead need data of the motor vehicle dealer; and routing each lead based upon the satisfaction of the business rules.

An aspect of the present disclosure comprises a system for performing a process for evaluating motor vehicle leads for a motor vehicle dealer. At least one embodiment of such system may comprise a processing element capable of at least one of performing and facilitating performance of the process, the process may comprise the steps of determining a score for each lead; valuing each lead at least based on the score of the lead and outcome data stored in an outcome database, the outcome data comprises historical information on lead closings; determining at least sales capacity and lead need data of a motor vehicle dealer; using a processor to apply business rules to at least the score and value of each lead, the business rules comprise at least the real-time optimization of sales for the motor vehicle dealer based at least partially upon the sales capacity and lead need data of the motor vehicle dealer; and routing each lead based upon the satisfaction of the business rules.

An aspect of the present disclosure comprises a computer program product for performing a process for evaluating motor vehicle leads for a motor vehicle dealer. At least one embodiment of such a computer program product may comprise at least one computer-readable storage medium having computer-readable program code portions stored therein for at least one of performing and facilitating performance of the process, the process may comprise the steps of determining a score for each lead; valuing each lead at least based on the score of the lead and outcome data stored in an outcome database, the outcome data comprises historical information on lead closings; determining at least sales capacity and lead need data of a motor vehicle dealer; using a processor to apply business rules to at least the score and value of each lead, the business rules comprise at least the real-time optimization of sales for the motor vehicle dealer based at least partially upon the sales capacity and lead need data of the motor vehicle dealer; and routing each lead based upon the satisfaction of the business rules.

BRIEF DESCRIPTION OF THE DRAWINGS

The features and advantages of this disclosure, and the manner of attaining them, will be more apparent and better understood by reference to the following descriptions of the disclosed system and process, taken in conjunction with the accompanying drawings, wherein.

DETAILED DESCRIPTION

Figure 1A:
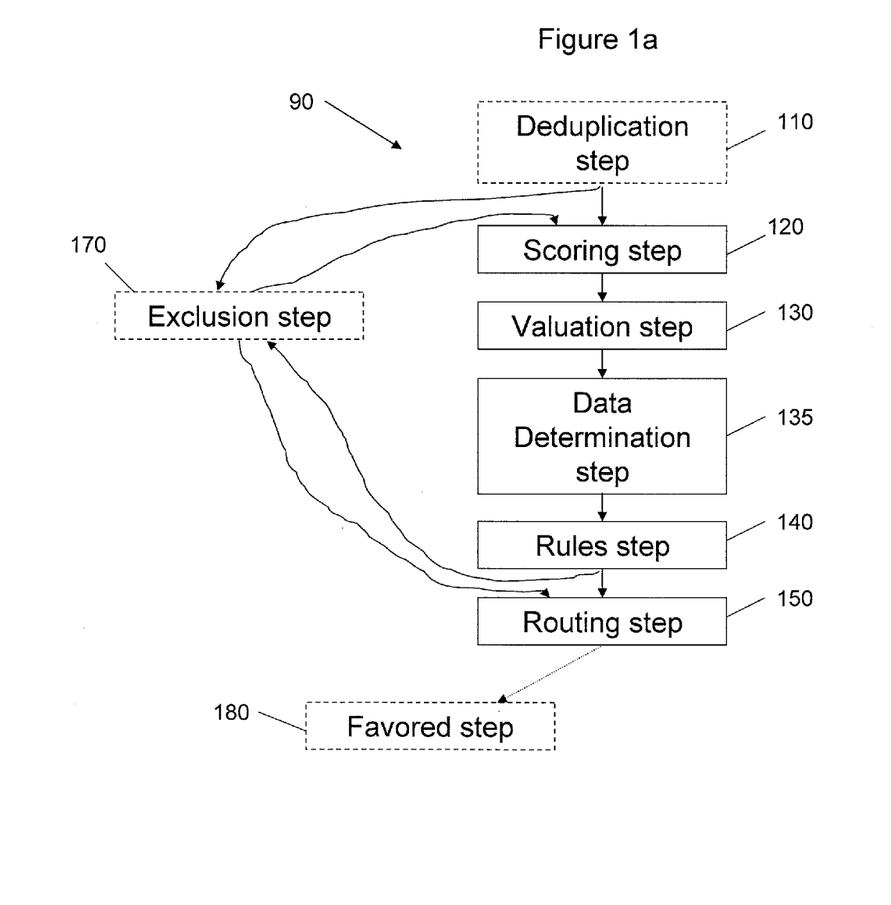
FIG. 1a shows a flowchart of a process according to at least one embodiment of the present disclosure for evaluating leads for a motor vehicle dealer.

In FIG. 1a, a process for evaluating motor vehicle leads for a motor vehicle dealer 90 is provided. Consumers frequently visit multiple research sites on the World Wide Web when shopping for motor vehicles, which may result in duplicate leads being generated and subsequently sent to a motor vehicle dealer. Accordingly, as shown in FIG. 1a, the first step of process 90 may optionally be to determine whether a lead is redundant with respect to another lead that has already been received by the process 90, referred to herein as the deduplication step 110. Typically, the deduplication step 110 may be performed in real time, as leads are received. For example, deduplication step 110 may compare at least a portion of a newly received lead to a database that stores information on previously received leads. If the newly received lead is a duplicate, the deduplication step 110 may flag the lead as duplicate, update lead provider statistics in a database, forward the duplicate lead to the lead provider where a request for credit (or reimbursement) on the dealer's account may be initiated, and/or forward the duplicate lead to the dealer with a note that the lead is a duplicate. For example, a dealer or lead provider may receive an electronic communication (e.g., an XML message) indicating a particular lead or leads is duplicative. It should be noted that a duplicate lead may be described as a lead that is the same exact lead as a previously received lead or a lead that satisfies a predetermined level of similarity with a previously received lead. While the deduplication step 110 may optionally be performed as soon as a lead has been received or shortly thereafter, it may be performed after one of the steps discussed below or may not be part of the process at all. If the deduplication step 110 is performed and duplicative leads are discarded, returned, or the like, one or more steps below may only receive and therefore operate on non-duplicative leads.

As shown in FIG. 1a, a step performed by process 90 may be the determination of a predictive lead score for a lead, referred to herein as the scoring step 120. The scoring step 120 may include the utilization of a scoring vendor (e.g., Acxiom) or the like to determine a commercial score for a lead. The scoring step 120 may also include enhancing a commercial lead score to be more predictive of the likelihood of the lead resulting in a purchase. An enhanced commercial lead score is referred to herein as a predictive lead score. The predictive score may be based upon the make, model, year, condition, and other characteristics of the motor vehicle requested in the lead. The predictive score may also be based upon attributes of the potential customer, such as income, age, credit score, and past purchasing history. The predictive score may further be based upon other interactions such as the number of times the client visited the dealer web site, requested an appraisal for a vehicle, and/or whether the client has been a loyal customer. The information used to enhance a commercial lead score may be stored in a Customer Relationship Management ("CRM") system or other data management system. The predictive scoring may be determined on any type of scale, such as a range from 1 to 5 with 5 being a lead most likely to purchase a motor vehicle. For example, a vendor may give a particular lead a commercial lead score of 2. After enhancement, a predictive score of 3 may be generated. It should be noted that the predictive score may be greater than, less than, or equal to the commercial lead score depending upon the effect of the factors discussed above.

The scoring step 120 may include supplementing a lead with missing contact and qualifying information. This supplemental information may be data that is locally stored within a database, data supplied by a lead provider, or other data source. The supplemental information may include phone numbers and email addresses or other types of information. The supplemental information may be used to calculate the predictive lead score. The resulting predictive lead score and/or contact and qualifying information may be stored in a scoring/value database or other storage entity.

As shown in FIG. 1a, another step performed by process 90 may be a lead valuation step 130. The valuation step 130 may provide a close rate probability or velocity calculation (predicted speed of purchase), profitability data, and other valuation information for each lead. For the lead valuation step 130, the attributes of the incoming leads (e.g., lead provider, score, lead cost, make and model requested) may be compared against a predictive outcome database to determine a value or value range for the lead. The outcome database may be populated with historical close rates and profitability data arranged by lead provider, by lead score, by franchise, and the like. For instance, the outcome database may include an entry that 2006 Ford Focus vehicles with a score of 2 have a 5% close rate and an average $2,000 profitability upon sale. As described above, the source of a lead, the score of a lead, and the product requested in a lead (e.g., two-door motor vehicle) may be stored in the scoring/value database or the like. Using this stored identity information of a lead, the valuation step 130 may determine the probability of the lead closing, potential profitability, and the like based on the historical data contained in the outcome database. The valuation step 130 may also determine how quickly a particular lead may close based on the score of the lead, historical data contained in the outcome database, attributes of the client, and other information. For example, the valuation step 130 may estimate that lead B will close in 2 weeks, 4 weeks, or another length of time. Based upon the probability of the lead closing, profitability, closing speed, and/or other valuation elements, the valuation step 130 may determine a value for the lead. The value may be numerical (e.g., a range from 1 to 5), quantitative (e.g., bad, average, good, rapid speed of purchase, slow speed of purchase), a dollar value or another system of differentiating leads. In any case, the value or value range for the lead may be stored in the scoring/value database or another storage entity.

As shown in FIG. 1a, another step performed by process 90 may be the determination of the motor vehicle dealer's sales capacity and the current need for leads of that motor vehicle dealer, referred to herein as the data determination step 135. Based at least partially on the data determination step 135, process 90 may have visibility into various aspects of a motor vehicle dealer's operation that affect sales capacity and need, including the number of sales people, their work hours, the number of deals in process for each salesperson, the number of each type of vehicle on the dealer's lot, when and what type of motor vehicles are going to be delivered, the number of leads for each type of vehicle, the score of each lead if available, and the like. Alternatively or in addition, the data determination step 135 may include receiving or retrieving the number and type (e.g., make and model of a motor vehicle) of leads needed by a motor vehicle dealer to maximize sales. In other words, in some circumstances, the motor vehicle dealer may supply the number and type of leads it needs to maximize sales. In other circumstances, the motor vehicle dealer may provide factors that affect sales capacity and lead need data of the dealer and process 90 (via rules step 140, described below) determines what leads (if any) the motor vehicle dealer needs to maximize sales.

Also, process 90 may know or have access to each salesperson's closing rate and specialization (e.g., Mary handles Ford and Bill handles Honda) and other dealer/salesperson-specific information. As described below, process 90 may utilize such salesperson-specific information to help determine which salesperson is the best choice to receive a certain lead.

In the data determination step 135, sales capacity and current need data of a motor vehicle dealer may be obtained by receiving or retrieving it directly from the dealer. For instance, the data determination step 135 may include automatically retrieving sales capacity and need data from one or more computer data systems of a motor vehicle dealer each time a lead is received or at some other time interval. Alternatively, data determination step 135 may include receiving or retrieving sales capacity and need data from the dealer at scheduled times, such as twice a day, once a week, each month, twice a year, and the like. The data determination step 135 may typically include receiving or retrieving sales capacity and need data electronically from a dealer's in-house computer system. However, it should also be noted that the dealer's sales capacity and need data may be stored on a vendor's system or other $3^{rd}$ party. In that case, the data determination step 135 may include communicating with the vendor or other $3^{rd}$ party in order to receive or retrieve the sales capacity and need data. The data determination step 135 may include receiving or retrieving vehicle inventory of a dealer, which may then be searched in view of possible vehicles of interest. For example, if a lead comes in with a request for a quote on a convertible, dealer inventories may be searched for convertibles but other vehicles in which the prospect may be interested may also be searched, such as sporty motor vehicles. Also, while the data determination step 135 is shown following the lead valuation step 130, it may be performed before or after any step in the process 90. Data determination step 135 may also be performed several times across process 90.

As shown in FIG. 1a, another step performed by process 90 may be the application of business rules to at least the score and value of a lead, referred to herein as the rules step 140. The rules step 140 may allow a motor vehicle dealer to establish business rules (e.g., quality criteria) to be applied in real-time to incoming leads. For example, a dealer may only want to buy leads if the effective cost of the leads per sale is less than $300 (e.g., greater than 1 in 15 leads result in a sale at a lead cost of $20 per lead). If the effective lead cost is $400, process 90 may return the lead to the lead provider, request a credit (or reimbursement), or the like. On the other hand, if the effective lead cost is $299, process 90 may forward the lead to the dealer.

Generally, business rules comprise the real-time optimization of sales capacity and lead need of a motor vehicle dealer. As a result, the rules step 140 may typically consider the factors that affect sales capacity and lead need data of a dealer and/or other information received in the data determination step 135, such as the number and type of leads needed to maximize sales. The rules step 140 may determine the leads needed to maximize sales capacity and/or revenue for the dealer based upon sales capacity and lead need data. As stated above, the data determination step 135 may receive or retrieve from the dealer directly the number and mix of leads to select in order to optimize the sales capacity and/or revenue for the motor vehicle dealer. In this latter case, the dealer's determination of the leads needed for optimization, which was received or retrieved, may be verified against dealer information regarding factors affecting sales capacity and lead need of the dealer. In any case, the rules step 140 may determine whether or not a particular type of lead or leads is needed by a motor vehicle dealer in real-time.

Using this determination of what type of lead or leads is needed by a dealer, the rules step 140 may analyze each incoming lead based on its score, valuation, and other information. For example, the data determination step 135 may yield information that a dealer has 20 trucks on its lot but just two leads for trucks. The rules step 140 may determine that the dealer may optimize sales capacity and lead need by acquiring thirty truck leads. Until thirty truck leads are chosen for the dealer or the sales capacity and lead need of the dealer otherwise changes, rules step 140 may continue analyzing incoming leads for truck leads and, as described below, acquiring truck leads for the dealer that satisfy the business rules. The rules step 140 may also determine that the dealer optimizes sales capacity and lead need when each sales person has a particular number of leads. For example, if rules step 140 determines that a sales person has less than 14 active deals (via the determination data step 135) and would maximize sales if he or she had 14 active deals, it may automatically begin searching through leads using score and value data and providing leads that satisfy the business rules to the salesperson until he or she has 14 active deals. As described below, process 90 may also automatically solicit leads from lead providers to fulfill certain needs, such as to supply leads to a particular salesperson with less than 14 active deals.

The rules step 140 may also determine which salesperson at a dealership has the best chance of making a sale on a lead based upon, for example, the salesperson's past success with that type of client and/or motor vehicle lead. Rules step 140 may analyze success of salespersons according to customer segments (e.g., age) from various marketing systems, such as Acxiom. If rules step 140 finds a positive correlation between one or more salespersons and a lead, the lead may be distributed to a dealership along with information on which sales person has the best chance of making a sale on the lead. A CRM system or the like used by the dealer may take into account the information on the salesperson that is most likely to succeed in its lead distribution algorithms.

After determining in real-time the optimum number and types of leads for a dealer, process 90 may automatically route each lead based upon the satisfaction of the business rules, referred to herein as routing step 150. Generally, the routing step 150 may route leads to various devices and/or entities based on the results of the rules step 140. Accordingly, the routing step 150 may include sending leads to a CRM system, sending leads to a $3^{rd}$ party vendor, sending leads to lead providers, sending leads to various databases, making leads available to various programs and entities, and the like. For example, leads that satisfy the business rules and have a predictive lead score of 4 or 5 might be sent to a particular salesperson through the CRM system. On the other hand, leads that satisfy the business rules and have a predictive lead score of 1, 2, or 3 may be routed to a call center for further contact and qualification data before the leads are routed to a salesperson. The leads that do not satisfy the business rules of the dealer may be automatically submitted to a lead provider for a credit (or reimbursement), forwarded to the dealer with a note indicating that such leads do not satisfy the business rules, and the like.

It is also contemplated that process 90 may optionally include communicating electronically with lead providers to instruct them which vehicles to exclude in lead generation, referred to herein as lead exclusion step 170. For example, suppose a potential motor vehicle buyer visits a website (e.g., www.KBB.com) that generates quote requests of vehicles for potential customers. The potential buyer decides to request a quote from a couple of dealers for a hybrid automobile. The hybrid automobile requested by the potential buyer happens to be a highly requested quote and, therefore, many dealers do not need or want any more leads for this vehicle. In order to express this lack of need for the particular hybrid automobile leads, exclusion step 170 may generate instructions to lead providers that specific dealers no longer need such leads. After sending such instructions to lead providers, the dealers that no longer need leads for the hybrid automobile would not be presented as prospects for the hybrid automobile quote on the lead providers websites. In other words, exclusion step 170 may include sending a message to websites instructing them not to display certain dealerships on the lists supplied to consumers for quotes on the hybrid automobile. Process 90 may send information to a lead provider when detecting various types of disfavored leads, e.g., duplicate leads. That is, process 90 may inform a lead provider that it has received a duplicate lead or other disfavored lead. In response, the lead provider may review the dealer's account and/or provide a credit (or reimbursement) for the duplicate lead. Process 90 may also generally track duplicate leads, such as by recording the information on leads including origins thereof. Therefore, as shown in FIG. 1a, the exclusion step 170 may optionally be performed after the deduplication step 110 and/or the rules step 140.

In addition or alternatively, process 90 may also optionally include the step of communicating electronically with lead providers requesting leads on favored motor vehicles, referred to herein as the favored step 180. Favored motor vehicles may generally be described as motor vehicles that have less than an optimal lead count associated therewith. Based on the favored request, lead providers may advertise such motor vehicles on their websites and the like. As shown in FIG. 1a, the favored step 180 may optionally follow the routing step 150 but may follow other steps. As described below, purchase step 145 and favored step 180 may combine into one step or operate together to acquire desired leads.

Figure 1B:
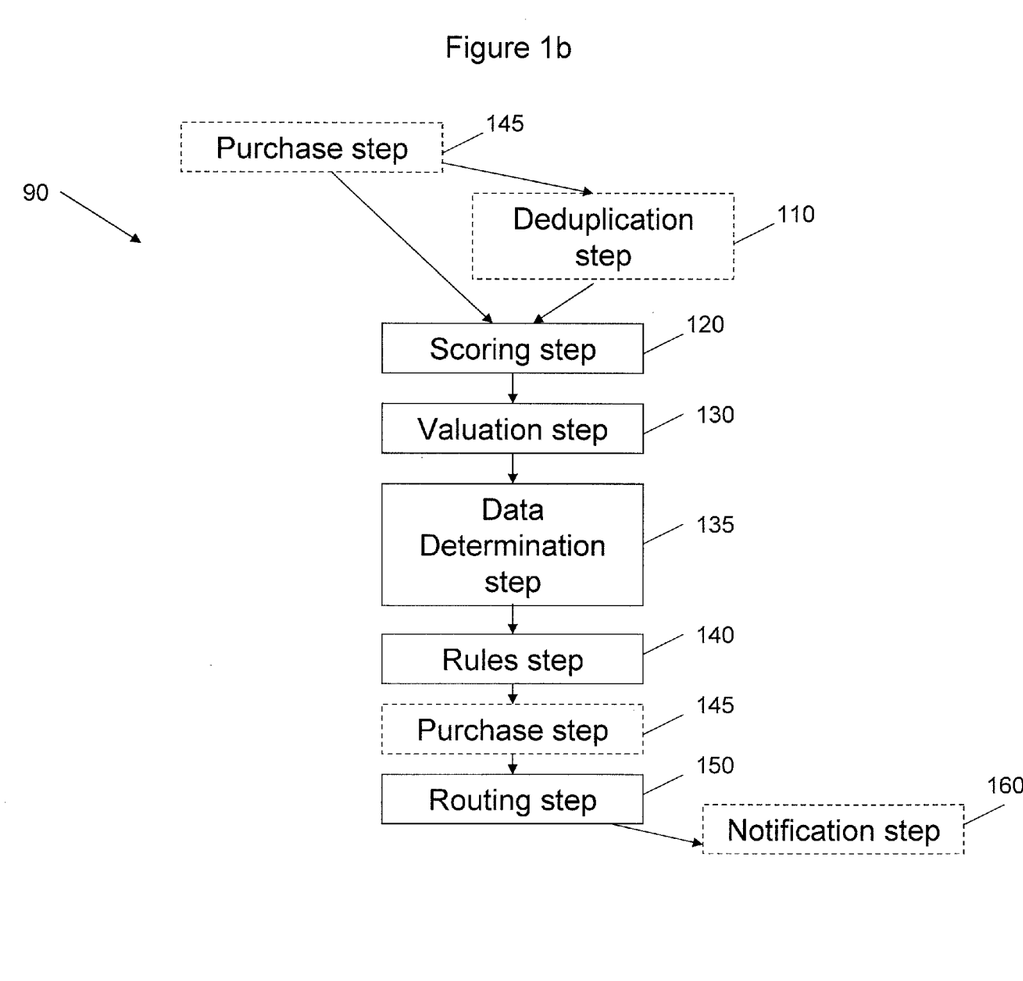
FIG. 1b shows a flowchart of a process according to at least one embodiment of the present disclosure for evaluating leads for a motor vehicle dealer.

As shown in FIG. 1b, process 90 may optionally include a step for purchasing leads, herein referred to as the purchase step 145. As shown in FIG. 1b, purchase step 145 may occur at the beginning of process 90 or after rules step 140. The following discussion relates to these two scenarios; however, it is contemplated that the purchase step 145 may be performed before or after other steps of process 90.

If the purchase step 145 occurs at the beginning of process 90, each incoming lead may be purchased. As mentioned above, if the lead is a duplicate, fails to satisfy the business rules, and the like, then the dealer may be able to get a credit (or reimbursement) on such a lead. For example, the routing step 150 may send these unwanted leads to the lead provider in an attempt to get a credit for the dealer or may pass these unwanted leads to the dealer with a notice that they should be submitted for a credit.

If the purchase step 145 follows rules step 140, purchase step 145 may automatically purchase leads that satisfy the business rules to the dealer. Based upon sales capacity and lead need information and/or optimum lead levels and types, purchase step 145 may purchase leads at the best price, for the correct products, and at the proper time. In other words, a dealer may not have to worry about which leads to buy or what time is the best time to buy certain leads. For example, a dealer may not have to worry about whether to purchase third-party leads on a Monday after the dealer ran an advertising campaign that swamped the showroom over the weekend because the present process can account for such an occurrence and make the optimized choice determination of whether leads should or should not be purchase. These optimum lead decisions may result in lower overall cost of lead acquisition and an increase in overall lead quality. The leads that do not satisfy the business rules of the dealer may automatically be returned to a lead provider and the like.

Purchase step 145 may purchase leads in a variety of ways. If purchase step 145 occurs at the beginning of process 90, then the purchasing of leads may be performed in any manner known to one skilled in the art. For example, purchase step 145 may include one or more lead providers sending leads and process 90 purchasing each lead that is received, meets some specified price, or the like. The purchase step 145 may also include issuing buy orders to lead exchanges, submitting bids on key words of web search sites, and alerting the dealer of a particular lead need. If purchase step 145 occurs after the rules step 140 (or other steps), purchase step 145 may include communicating with lead providers that a particular lead has been selected. For example, if rules step 140 determines that lead A should be purchased, purchase step 145 may send an electronic communication (e.g., an XML message) to the lead provider that provided lead A. The communication may indicate that a particular dealer has decided to buy lead A, which may trigger a buy authorization for the lead provider. Alternatively, purchase step 145 may include simply notifying an Internet Manager to purchase a lead that satisfies the business rules, and the Internet Manager may make the purchase. Purchase step 145 may also facilitate the purchasing of leads by keeping track of each lead purchased by each dealer and periodically supplying the lead providers with this purchasing information.

As mentioned above, purchase step 145 may also be combined with favored step 180 or operated together therewith to acquire leads needed by the dealer. For instance, process 90 may determine that a dealer needs a number of a certain type of lead in order to sell a particular vehicle. Process 90 may alert an Internet Manager or other dealership employee that the dealer should order a certain number of leads of specific years, makes, and models to generate traffic to sell the vehicle. On the other hand, process 90 may automatically issue electronic buy orders through lead exchanges, such as Reply.com, Detroit Trading Exchange, and/or web search sites, such as Yahoo or Google. Process 90 may issue buy orders to the lead exchanges for the specific years, makes, and models needed to optimize sales for a dealer based on available inventory and sales capacity. Process 90 may automatically adjust the parameters of the buy orders, such as price, in order to increase or decrease the volume of purchased leads. The process 90 may automatically increase bids on key words for web search sites (e.g., 2009 Toyota Tundra) in order to generate additional traffic.

Figure 2:
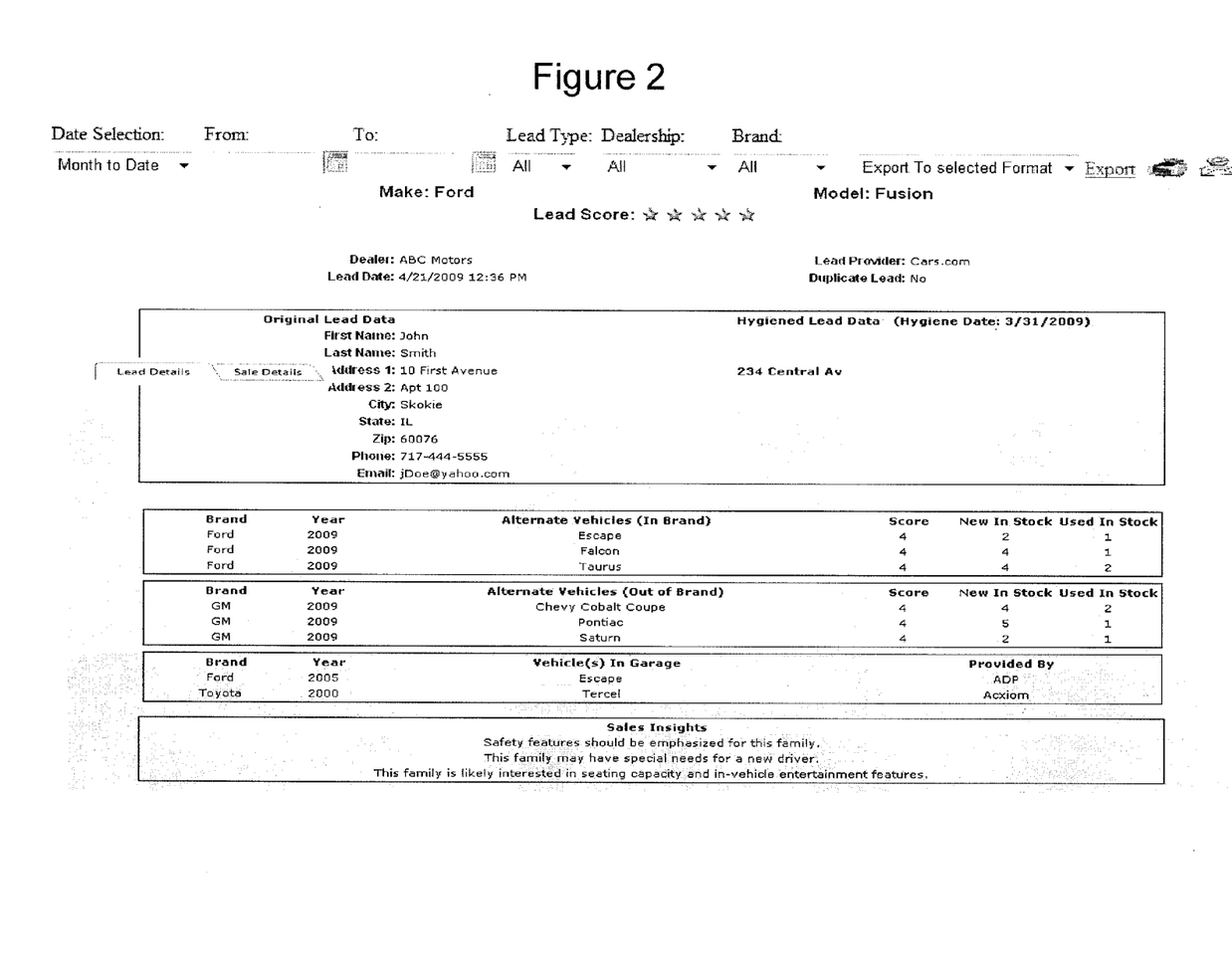
FIG. 2 shows a computer interface for reviewing evaluated leads according to at least one embodiment of the present disclosure for evaluating leads for a motor vehicle dealer.

As shown in FIG. 1b, process 90 may optionally notify or alert the purchasing motor vehicle dealer or other entity, referred to herein as the notification step 160. The purchasing motor vehicle dealer or other entity may be notified or alerted via mail, email, telephone call, instant message, or some other form of communication. Instead of directly contacting a motor vehicle dealer, the notification step 160 may include sending purchase data to a computer database that may be accessible to dealers. For example, FIG. 2 shows an example of how the purchase information may be displayed as seen by a motor vehicle dealer upon accessing a computer program and database. It should also be noted that a user may have access to lead scoring or other information from process 90 via a hyperlink, XML message, or the like located on the computer interface in FIG. 2, in an email, or the like.

As used herein, a lead may generally be described as information regarding a good and/or service and the person or entity that is interested in purchasing the good and/or service. Leads may be generated in any number of ways, including Internet marketing, advertising, phone calls, and the like. A lead may take various forms, including printed paper, e-mail, and web-based forms, among others. It should be noted that the description of the process and system below is generally described in terms of motor vehicle leads being sent and received across an electronic network, such as the World Wide Web, telephone network, and the like. However, it is contemplated that the process described above may be used with any type of lead, such as for furniture, homes, cleaning services, and the like.

Figure 3:
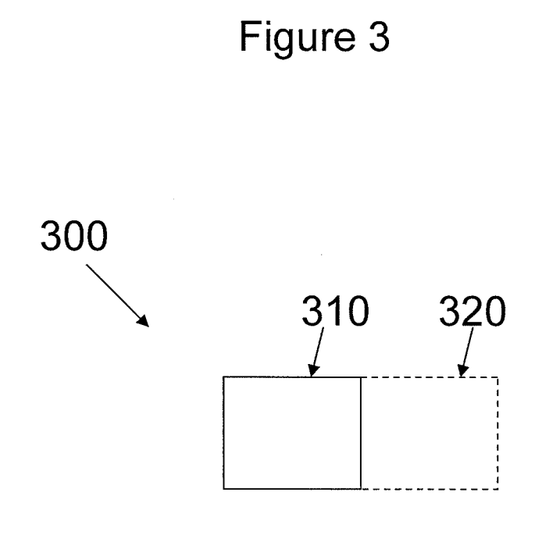
FIG. 3 shows a system according to at least one embodiment of the present disclosure for evaluating leads for a motor vehicle dealer.

In FIG. 3, a system for evaluating leads for a motor vehicle dealer 300 is provided. As shown in FIG. 3, the system 300 may be embodied by a processing element 310 and optionally an associated memory device 320, both of which may be commonly comprised by a computer system or the like. In this regard, the process of embodiments of the present disclosure can be at least partially performed by the processing element manipulating data stored by the memory device with any one of a number of commercially available computer software programs. The computer system can include a display for presenting information relative to performing embodiments of the present disclosure.

Also, the computer system can include a means for locally or remotely transferring the information relative to performing embodiments of the process of the present disclosure. For example, the computer system can include a facsimile machine for transmitting information to other facsimile machines, computer systems or the like. Additionally, or alternatively, the computer system can include a modem to transfer information to other computers or the like. Further, the computer system can include an interface to a network, such as a local area network (LAN), and/or a wide area network (WAN). For example, the computer system can include an Ethernet Personal Computer Memory Card International Association (PCMCIA) card configured to transmit and receive information to and from a LAN, WAN or the like.

According to one aspect of the present disclosure, the system 300 of the present disclosure generally operates under control of a computer program product. The computer program product for performing the embodiments of the present disclosure includes a computer-readable storage medium, such as a non-volatile storage medium, and computer-readable program code portions, such as a series of computer instructions, embodied in the computer-readable storage medium. It should be understood that the computer-readable program code portions may include separate executable portions for performing distinct functions to accomplish embodiments of the process of the present disclosure. Additionally, or alternatively, one or more of the computer-readable program portions may include one or more executable portions for performing more than one function to thereby accomplish embodiments of the process of the present disclosure.

FIGS. 1a and 1b are flowcharts of a process, system, and program product according to the disclosure. It will be understood that each block or step of the flowcharts and combinations of blocks in the flowcharts, can be implemented by computer program instructions. The computer program instructions may be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowcharts block(s) or step(s).

Blocks or steps of the flowcharts support combinations of means for performing the specified functions, combinations of steps for performing the specified functions, and program instruction means for performing the specified functions. It will also be understood that each block or step of the flowcharts, and combinations of blocks or steps in the flowcharts, can be implemented by special purpose hardware-based computer systems which perform the specified functions or steps, or combinations of special purpose hardware and computer instructions.

Figure 4:
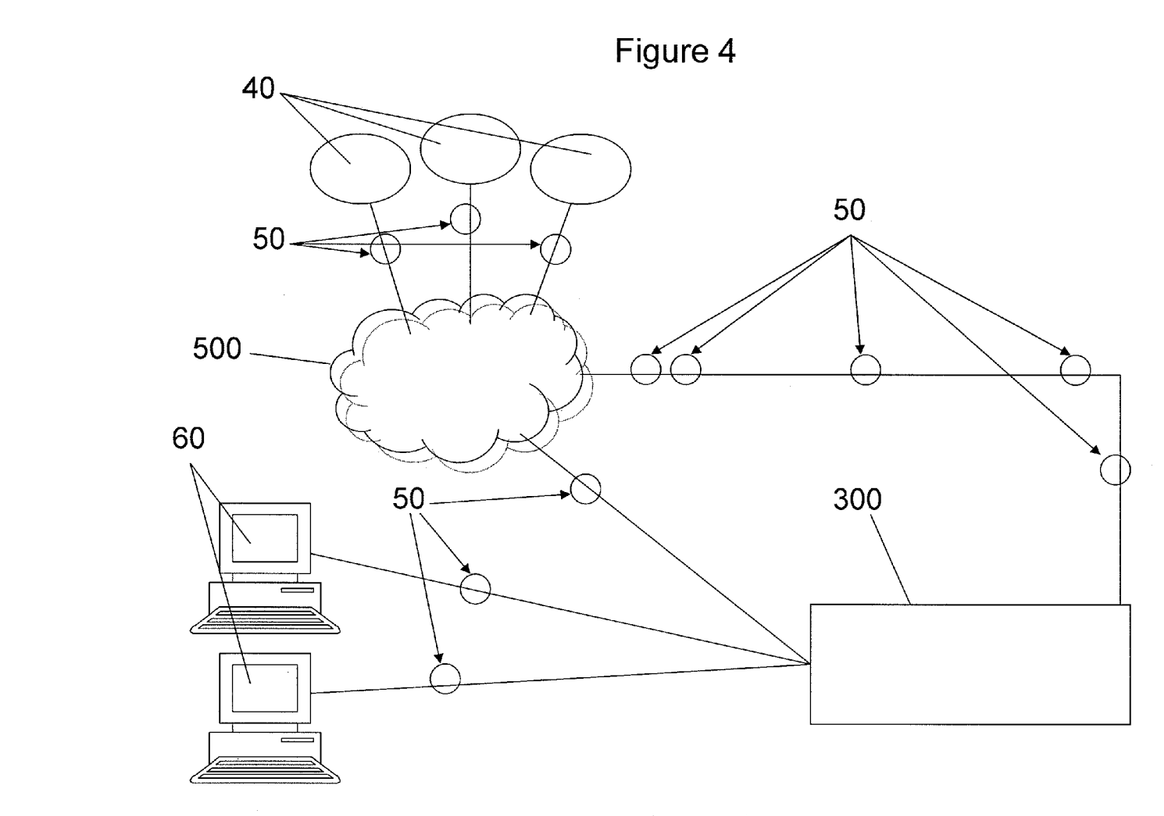
FIG. 4 shows a system according to at least one embodiment of the present disclosure in communication with a network and lead providers.

System 300 may be operably connected to a system server including through a network such as the Internet. In FIG. 4, for example, dealership computer systems 60 and/or system 300 may be operably connected to a system server. A dealership computer or lead provider computer as described herein may be a computer, computing device, or system of a type known in the art, such as a personal computer, mainframe computer, workstation, notebook computer, laptop computer, hand-held computer, wireless mobile telephone, personal digital assistant device, and the like. One or more administrator computers may also be operably connected to the system server including through a network such as the Internet. Administrator computers, similar to dealership computers, may be computers, computing devices, or systems of a type known in the art, such as personal computers, mainframe computers, workstations, notebook computers, laptop computers, hand-held computers, wireless mobile telephones, personal digital assistant devices, and the like. Administrator computers may be used, for example, by entities that control, maintain, and operate system 300. It should be noted that system 300 may, alternatively, be controlled, maintained, and/or operated using a computer that is directly connected to or otherwise connected to system 300 without using a system server. The computers described above may each comprise such software (operational and application), hardware, and componentry as would occur to one of skill of the art, such as, for example, one or more microprocessors, memory, input/output devices, device controllers, and the like. The computers described above may also comprise one or more data entry means operable by a user of a computer, such as, for example, a keyboard, keypad, pointing device, mouse, touchpad, touchscreen, microphone, and/or other data entry means known in the art. The computers described above may also comprise an audio display means such as one or more loudspeakers and/or other means known in the art for emitting an audibly perceptible output. The configuration of computers in a particular implementation of a system for evaluating motor vehicle leads for a motor vehicle dealer of the present disclosure is left to the discretion of the practitioner(s).

A system server may comprise one or more server computers, computing devices, or systems of a type known in the art. A system server may comprise a server memory and one or more components of solid-state electronic memory, such as random access memory. A system server may also comprise an electromagnetic memory such as one or more hard disk drives and/or one or more floppy disk drives or magnetic tape drives, and may comprise an optical memory such as a Compact Disk Read Only Memory (CD-ROM) drive. A system server may further comprise such software (operational and application), hardware, and componentry as would occur to one of skill of the art, such as, for example, microprocessors, input/output devices, device controllers, video display means, and the like.

A system server may comprise one or more host servers, computing devices, or computing systems configured and programmed to carry out the functions allocated to a system server. A system server may be operated by, or under the control of, a "system operator," which may be an individual or a business entity. For purposes of clarity, a system server is referred to herein as a single server. A system server need not, however, be a single server. A system server may comprise a plurality of servers or other computing devices or systems connected by hardware and software that collectively are operable to perform the functions allocated to a system server according to a system for evaluating motor vehicle leads for a motor vehicle dealer of the present disclosure. Although one or more of the computers disclosed above may be connected directly to one or more system servers, these computers may be connected to a system server through any suitable network.

One or more system servers may be operably connected to dealership computers 60, system 300, and other devices by one or more networks. A network may comprise the Internet (a global computer network) or any means for electronically interconnecting a system server and computers. Thus, it will be appreciated by those of ordinary skill in the art that a network may comprise the Internet, the commercial telephone network, one or more local area networks, one or more wide area networks, one or more wireless communications networks, coaxial cable, fiber optic cable, twisted-pair cable, the equivalents of any of the foregoing, or the combination of any two or more of the foregoing. A network may comprise packet switched facilities, such as the Internet, circuit switched facilities, such as the public switched telephone network, radio based facilities, such as a wireless network, etc.

In FIG. 4, a system 300 and computers 60 are shown interacting with lead providers 40 via network 500. As shown in FIG. 4, leads 50 may be routed across network 500 to the system 300 from various sources, including lead providers 40, such as 3rd party lead providers, automotive OEM web sites, and dealer web sites. It should be noted that lead providers may be lead generators or lead aggregators. Lead generators may typically include research portals where consumers can go to research motor vehicles, value trade-ins, and the like. Examples of lead generators may include various websites, such as MSN Autos, Yahoo Autos, Kelley Blue Book®, and Edmunds. Lead generators often sell leads to lead aggregators who typically have direct relationships with dealers. Examples of lead aggregators may include various websites, such as Dealix and Autobytel. A lead source may also include a web-based search engine that generates leads to a dealer's website based upon, for example, key words. Another lead source may include an appraisal widget, which is a program accessible on a web site where the consumer can obtain a trade value for their vehicle. The consumer may be invited to request a quote which generates a lead (typically from the dealer website).

In FIG. 4, leads 50 received by system 300 may be processed using the steps described above. As shown in FIG. 4, depending upon the result of one or more steps performed by system 300, leads 50 may be routed to dealer computers 60, returned to lead providers via network 500, or sent to other devices and entities via network 500 or using another communication method.

While this disclosure has been described as having a preferred design, the process, system, and computer program product according to the present disclosure can be further modified within the scope and spirit of this disclosure. This application is therefore intended to cover any variations, uses, or adaptations of the disclosure using its general principles. For example, the process disclosed herein and in the appended claims represent one possible sequence of performing the steps thereof. A practitioner may determine in a particular implementation that a plurality of steps may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains and which fall within the limits of the appended claims.

That which is claimed is:

1. A process for evaluating motor vehicle leads for a motor vehicle dealer, the process comprising:
   determining a score for each lead;
   determining a value for each lead at least based on the score of the lead and outcome data stored in an outcome database, the outcome data comprises at least one of closing rates and profitability data on lead closings for the motor vehicle dealership;
   determining at least sales capacity and lead need data of a motor vehicle dealer;
   using a computer processor to apply business rules to at least the score and value of each lead, the business rules comprise at least the real-time optimization of sales for the motor vehicle dealer based at least partially upon the at least sales capacity and lead need data of the motor vehicle dealer; and
   routing each lead based upon the satisfaction of the business rules.

2. The process of claim 1, further comprising purchasing one or more leads.

3. The process of claim 1, wherein determining at least sales capacity and lead need data of a motor vehicle dealer comprises determining the number and type of leads needed by the motor vehicle dealer.

4. The process of claim 1, wherein determining a score for each lead comprises supplementing each lead that lacks at least a portion of contact and qualifying information.

5. The process of claim 1, wherein determining at least sales capacity and lead need data comprises at least determining the number of sales people that work for the motor vehicle dealer, work hours per sales person, and number of deals in process at the motor vehicle dealer; and
   wherein the business rules are based at least partially on the number of sales people that work for the motor vehicle dealer, the work hours per sales person, and the number of deals in process at the motor vehicle dealer.

6. The process of claim 1, wherein determining at least sales capacity and lead need data of a motor vehicle dealer comprises at least determining vehicle inventory data of the motor vehicle dealer.

7. The process of claim 1, further comprising instructing lead providers to exclude sending leads on a disfavored vehicle.

8. The process of claim 1 wherein determining at least sales capacity and lead need data further comprises determining sales data pertaining to sales people of the motor vehicle dealer;
   wherein the business rules correlate lead types to sales people based at least partially on the sales data; and
   wherein using the computer processor to determine whether the lead satisfies the business rules further comprises using the computer processor to determine which sales person to route the lead to based on the score of the lead, the value of the lead, and whether the lead satisfies the business rules.

9. The process of claim 1, wherein determining at least sales capacity and lead need data of a motor vehicle dealer comprises downloading the instantaneous status data for the motor vehicle dealer.

10. A system for performing a process for evaluating motor vehicle leads for a motor vehicle dealer, the system comprises a processing element capable of at least one of performing and facilitating performance of the process, the process comprising:
    determining a score for each lead;
    determining a value for each lead at least based on the score of the lead and outcome data stored in an outcome database, the outcome data comprises at least one of closing rates and profitability data on lead closings for the motor vehicle dealership;
    determining at least sales capacity and lead need data of a motor vehicle dealer;
    using a computer processor to apply business rules to at least the score and value of each lead, the business rules comprise at least the real-time optimization of sales for the motor vehicle dealer based at least partially upon the at least sales capacity and lead need data of the motor vehicle dealer; and
    routing each lead based upon the satisfaction of the business rules,
    wherein determining the value for each lead includes determining the value for a lead based on at least one of closing rates and the profitability data of lead closings having at least one attribute in common with the lead, the at least one attribute including one or more of the score of the lead, a lead provider, a lead cost, and a type of vehicle requested.

11. The system of claim 10, wherein the process further comprises purchasing one or more leads.

12. The system of claim 10, wherein determining a score for each lead comprises supplementing each lead that lacks at least a portion of contact and qualifying information.

13. The system of claim 10, wherein the type of lead comprises the make and model of a corresponding motor vehicle.

14. The system of claim 10, wherein determining at least sales capacity and lead need data of a motor vehicle dealer comprises determining vehicle inventory data of the motor vehicle dealer.

15. The system of claim 10, wherein the process further comprises instructing lead providers to exclude sending leads on a disfavored vehicle.

16. The system of claim 10, wherein the process further comprises determining whether each received motor vehicle lead is duplicative.

17. The system of claim 10, wherein determining at least sales capacity and lead need data of a motor vehicle dealer comprises determining the number and type of leads needed by the motor vehicle dealer.

18. A computer program product for performing a process of evaluating motor vehicle leads for a motor vehicle dealer, the computer program product comprises at least one non-transitory, computer-readable storage medium having computer-readable program code portions stored therein for at least one of performing and facilitating performance of the process, the process comprising:

determining a score for each lead;
 determining a value for each lead at least based on the score of the lead and outcome data stored in an outcome database, the outcome data comprises at least one of closing rates and profitability data on lead closings for the motor vehicle dealership;
 determining at least sales capacity and lead need data of a motor vehicle dealer;
 using a computer processor to apply business rules to at least the score and value of each lead, the business rules comprise at least the real-time optimization of sales for the motor vehicle dealer based at least partially upon factors that affect the at least sales capacity and lead need data of the motor vehicle dealer;
 the factors comprise at least one of a particular sales person's number of active leads, the sales person's past success in closing sales, and number of active deals, by salesperson, in progress within the dealership, showroom traffic arriving at the dealership as a result of dealership advertising, and dealership vehicle inventory; and
 routing at least one of the leads to the sales person based upon application of the business rules.

19. The computer program product of claim 18, wherein determining at least sales capacity and lead need data of a motor vehicle dealer comprises determining the number and type of leads needed by the motor vehicle dealer.

20. The computer program product of claim 18, wherein the process further comprises determining whether each received lead is duplicative.

21. The process of claim 1, wherein determining the value for each lead includes determining the value for a lead based on the closing rate and the profitability data of lead closings having at least one attribute in common with the lead, the at least one attribute including one or more of the score of the lead, a lead provider, a lead cost, and a type of vehicle requested.

* * * * *